_United States Patent_ [15] 3,666,018
Trahms [45] May 30, 1972

[54] GANG-PLOW

[72] Inventor: Harold R. Trahms, Route #2, Janesville, Minn. 56048

[22] Filed: Nov. 5, 1969

[21] Appl. No.: 874,199

Related U.S. Application Data

[63] Continuation-in-part of Ser. No. 533,496, Mar. 11, 1966, abandoned.

[52] U.S. Cl. ............................ 172/669, 172/707, 172/763, 172/776
[51] Int. Cl. ....................................................... A01b 15/14
[58] Field of Search ................. 172/669, 705, 707, 763, 762, 172/314, 574, 776, 444

[56] References Cited

UNITED STATES PATENTS

| 1,462,948 | 7/1923 | Thomas | 172/574 |
| 2,672,084 | 3/1954 | Forgy | 172/776 |
| 3,252,521 | 5/1966 | Van Der Lely | 172/449 X |
| 846,643 | 3/1907 | Bishop | 172/314 |
| 1,034,404 | 7/1912 | Paul | 172/314 |
| 1,107,733 | 8/1914 | Waterman | 172/314 |
| 1,187,559 | 6/1916 | Sobey | 172/314 |
| 2,180,610 | 11/1939 | Strandlund | 172/669 |
| 3,448,813 | 6/1969 | Rogers | 172/669 |
| 727,519 | 5/1903 | Whitehurst | 172/776 X |
| 1,438,513 | 12/1922 | Andeen | 172/776 X |

Primary Examiner—Robert E. Pulfrey
Assistant Examiner—R. T. Rader
Attorney—Merchant & Gould

[57] ABSTRACT

A gang-plow having a generally transversely extending backbone spaced rearwardly from a main wheeled frame, a plurality of forwardly extending beams affixed to the backbone adjacent the rear end thereof and having downwardly and forwardly extending standards affixed thereto adjacent the forward end, and plow bottoms affixed to the lower forward ends of the standards so as to be oriented beneath the space between the frame and the backbone.

5 Claims, 8 Drawing Figures

Patented May 30, 1972

INVENTOR.
HAROLD R. TRAHMS
BY Merchant & Gould
ATTORNEYS

INVENTOR.
HAROLD R. TRAHMS
BY Merchant & Gould
ATTORNEYS

Patented May 30, 1972

INVENTOR.
HAROLD R. TRAHMS
BY
Merchant & Gould
ATTORNEYS

3,666,018

GANG-PLOW

CROSS-REFERENCE TO RELATED APPLICATIONS

This application is a continuation-in-part of the co-pending U.S. application Ser. No. 533,496 now abandoned, filed Mar. 11, 1966, entitled "Gang-Plow Draft Means."

BACKGROUND OF THE INVENTION

1. Field of the Invention

In the agricultural and earth working fields it is often necessary to plow ground which is littered with trash, such as corn stalks, large dry weeds, etc. During the plowing of this ground the trash and debris has a tendency to collect around the standards of the plow bottoms and eventually hamper the operation of the plow so that time must be consumed in cleaning the plow and removing the trash and debris.

2. Description of the Prior Art

Many attempts have been made in the prior art to construct a plow which will reduce the trash accumulation problem. However, in each instance the plow is either extremely expensive and complicated or relatively ineffective to serve the desired purpose. For example, in U.S. Pat. No. 3,252,521, issued to Van Der Lely, May, 1966, a rotary plow is described wherein two identical sets of plow bottoms are affixed to a rotatably mounted backbone so that one set of plow bottoms projects upwardly above the backbone as the opposite set of plow bottoms is in operation. The trash is removed from the plow bottoms at the end of each furrow by rotating the plow bottoms so that the second set of bottoms comes into operation as the first set rotates into the upwardly projecting position. This is extremely expensive since it requires an additional set of plow bottoms along with the rotary mounting and equipment for rotating the plow bottoms.

In other plows, weed hooks, trash boards, and the like are affixed to the plow to turn the trash against the furrow as the earth is turned over. In general, these are equally ineffective since trash eventually accumulates around the weed hook as well as the standard and the entire apparatus must be cleaned.

SUMMARY OF THE INVENTION

The present invention pertains to a gang-plow wherein the plow bottoms are affixed adjacent the forward end of the beam so that the standard and the plow bottom extend generally forwardly and downwardly from the beam and the space above the plow bottom is open and there is no apparatus above the plow bottom to cause trash to collect.

It is an object of the present invention to provide a new and improved gang-plow.

It is a further object of the present invention to provide a gang-plow with the bottoms thereof situated so that trash and the like does not collect thereon.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
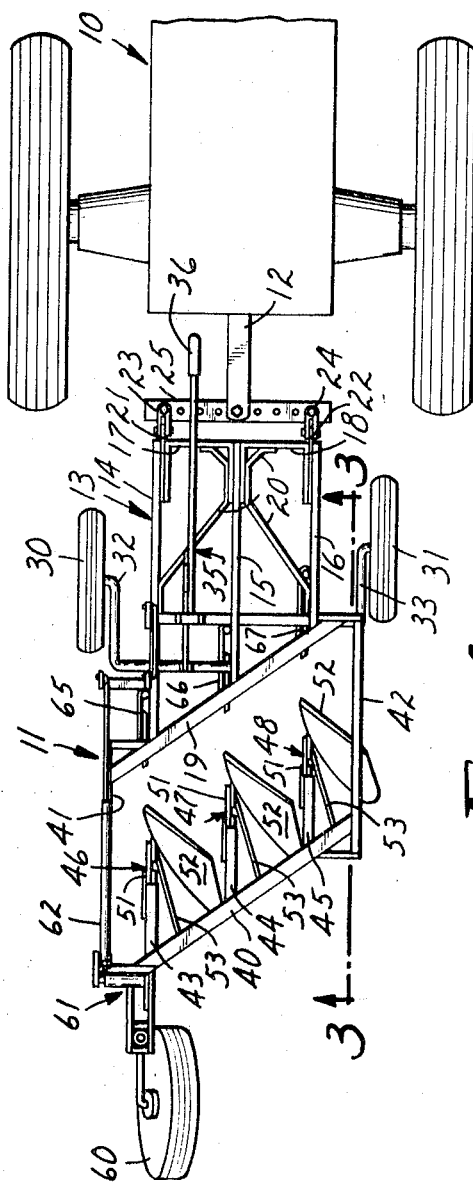
FIG. 1 is a view in top plan of the present gang-plow attached to a tractor.
Figure 2:
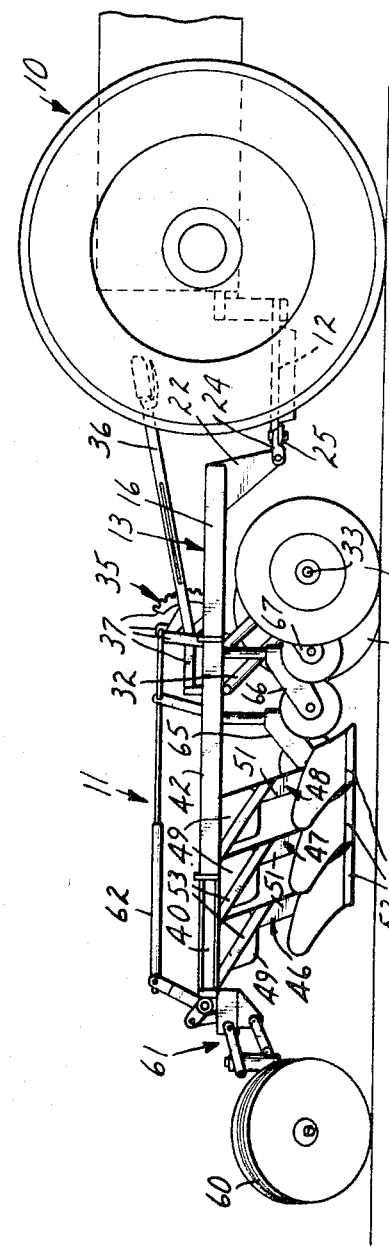
FIG. 2 is a view in side elevation of the present gang-plow.
Figure 3:
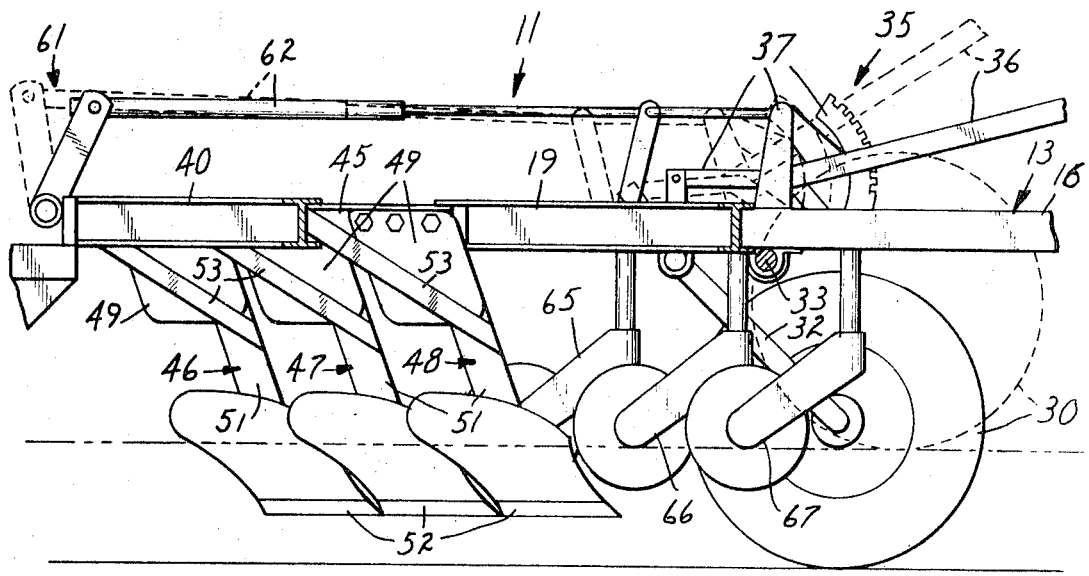
FIG. 3 is an enlarged sectional view as seen from the line 3—3 in FIG. 1.
Figure 4:
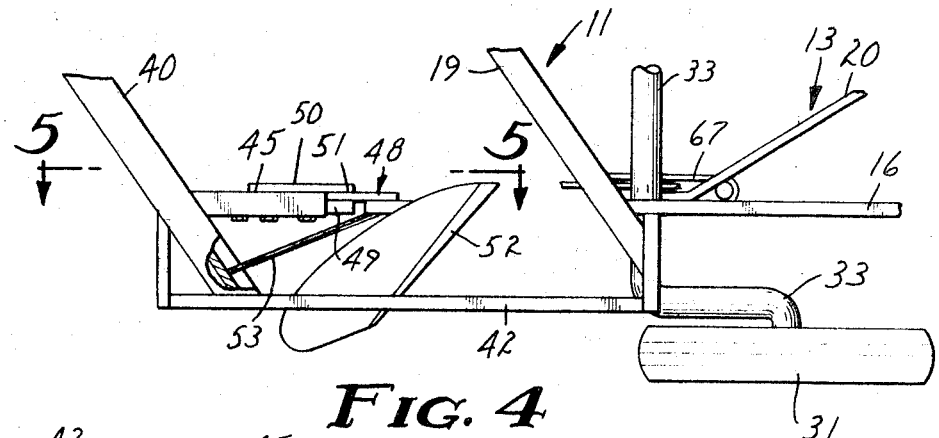
FIG. 4 is an enlarged detailed view of a portion of the gang-plow illustrated in FIG. 1 with parts thereof removed.
Figure 5:
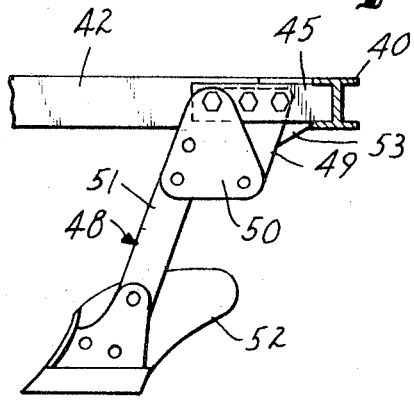
FIG. 5 is a sectional view as seen from the line 5—5 in FIG. 4.

In the figures the numeral 10 designates a tractor having the present gang-plow, generally designated 11, attached thereto by a draw bar 12. The gang-plow 11 has a frame 13 including three parallel members 14, 15 and 16 connected at their forward ends by a pair of U-shaped members 17 and 18, the bight of which extends perpendicular to the longitudinal axis of the members 14, 15 and 16, and at their rear ends by a member 19, which lies at an angle to the perpendicular of approximately 30°. The members 14, 15 and 16 also have some braces 20 attached therebetween for additional support. A pair of plates 21 and 22 are adjustably attached adjacent the front end of either outer member 14 and 16 and each have a clevis 23 and 24 respectively attached to the forwardmost lower point thereof, as seen in FIG. 2. The clevises 23 and 24 are in turn attached to a bar 25 positioned perpendicular to the members 14, 15 and 16 and adapted to have the draw bar 12 attached thereto.

A pair of wheels 30 and 31 are attached to the left and right sides, respectively, of the frame 13 by two shafts 32 and 33 respectively. The shaft 32 has two 90° bends therein so that one end of the shaft 32 is attached beneath the member 15 and the mid-portion thereof is attached beneath the member 14, after which a 90° bend directs a portion thereof downwardly and forwardly and the second 90° bend directs the remainder of the shaft 32 outwardly and the wheel 30 is rotatably mounted thereon. In a like manner the shaft 33 has two 90° bends therein with the wheel 31 mounted at the extreme outer ends thereof. However, the shaft 33 is somewhat longer than the shaft 32 and extends under the members 16, 15 and 14 and is spaced slightly forwardly of the shaft 32. A lifting mechanism generally designated 35 consists of a handle 36 and linking members 37, which are fixedly attached to the shafts 32 and 33 and operate through movement of the handle 36 to rotate the shafts 32 and 33 to raise or lower the frame 13 with respect to the wheels 30 and 31. In this fashion, the entire mechanism can be raised for travel on highways or the like and lowered for plowing. Since the lifting mechanism 35 is a conventional mechanism and since it forms no part of this invention, it will not be described further.

A backbone 40, which is constructed from a steel I-beam or the like, is spaced to the rear of and parallel with the member 19 in the frame 13. The backbone 40 is connected to the frame 13 by a pair of members 41 and 42 fixedly attached at either end thereof and attached to either end of the member 19 of the frame 13. The backbone 40 and the members 41 and 42 are attached together and to the frame 13 by some means such as bolts, welding, or the like. Fixedly attached to the backbone 40 and extending forwardly in parallel spaced apart relationship are three plow beams 43, 44 and 45. The beams 43, 44 and 45 are constructed of some rigid material, such as angle iron or the like, and lie substantially in a plane containing the members 14, 15 and 16, respectively, of the frame 13.

Three plow standards generally designated 46, 47 and 48 are fixedly attached to the beams 43–45, respectively, by some means such as bolts or the like. The standards 46–48 each include a first generally rectangularly shaped metal plate 49 attached along one edge to one side of the respective beams 43–45, a second generally triangularly shaped metal plate 50 attached by one apex to the other side of the respective beams 43–45 in parallel overlying relationship to metal plates 49, and an elongated member 51 having one end fixedly attached between plates 49 and 50 and the other end extending downwardly and forwardly at approximately 60° with the horizontal. Each elongated member 51 has a plow bottom 52 attached to the lower end thereof by means of bolts or the like. Each of the standards 46–48 has associated therewith a metal brace 53 one end of which is attached to the mid-section of the elongated member 51 and the other end of which is attached to the backbone at some appropriate angle from the standards 46–48.

A tail wheel 60 is rotatably attached to the rearmost end of the backbone 40, or the rear left side of the plow 11, by means of a lifting mechanism 61. The mechanism 61 is in turn attached to the linking members 37 of the lifting mechanism 35 by a linking rod 62. The lifting mechanism 61 operates to lower the tail wheel 60 when the front wheels 30 and 31 are lowered by lowering the handle 36. In like manner when the handle 36 is raised and the front wheels 30 and 31 are raised the tail wheel 60 is also raised to allow the plow bottoms 52 to dig into the earth to the desired depth. Since the lifting mechanism 61 and the linking rod 62 are conventional the operation thereof will not be discussed further.

Three colters 65–67 are attached to the members 14, 15 and 16, respectively, so they proceed the plow bottoms 52 in the conventional manner. While a yoke type colter with a plain circular blade is illustrated in the present embodiment it should be understood that any of the various types and configurations of colters might be utilized. Similarly a standard moldboard plow bottom is illustrated for each of the bottoms 52 but it should be understood that any of a variety of different plow bottoms might be utilized. Also, although three plow bottoms and three colters are illustrated in the present embodiment it should be understood that the plow might include any number of plow bottoms and co-operating colters.

In the operation of the gang-plow 11 the tractor 10 is attached to the frame 13 by the draw bar 12 and pulls the gang-plow 11 across a field in a conventional manner. However, the backbone 40 is spaced from the frame 13 and the plow bottoms 52 are mounted thereunder by the beams 43–45 and the standards 46–48 so that there are no obstructions above the plow bottoms 52 upon which trash and the like can collect. In effect, the plow bottoms 52 are being pushed through the field rather than pulled and trash, such as weeds, corn stalks and the like, are either plowed under the soil or are carried upwardly on the ramp-like standards 46–48 and may actually be carried over the backbone 40. Since there are no obstructions for trash to catch on, the trash has a greater tendency to be plowed under the soil and, therefore, there is much less chance of trash build-up, which tends to foul the operation of the plow, and the plow 11 is free to operate in a non-stop plowing action.

Figure 6:
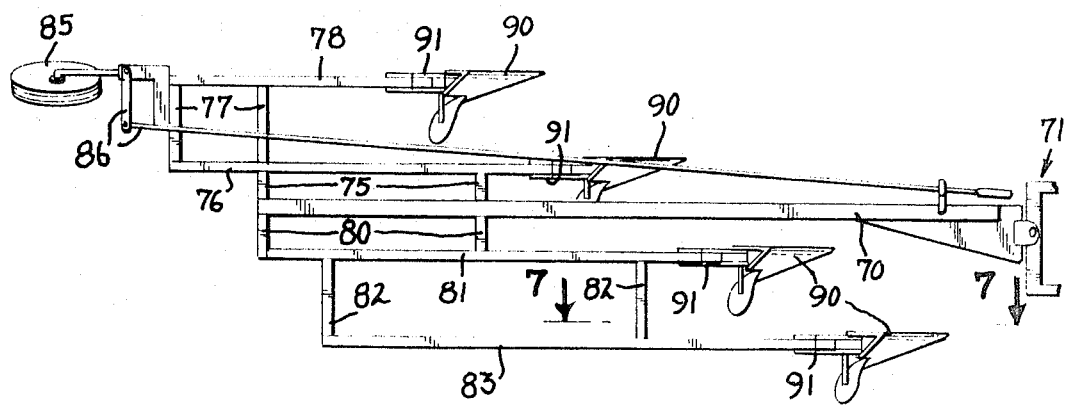
FIG. 6 is a view in top plan of another embodiment of the present gang-plow.
Figure 7:
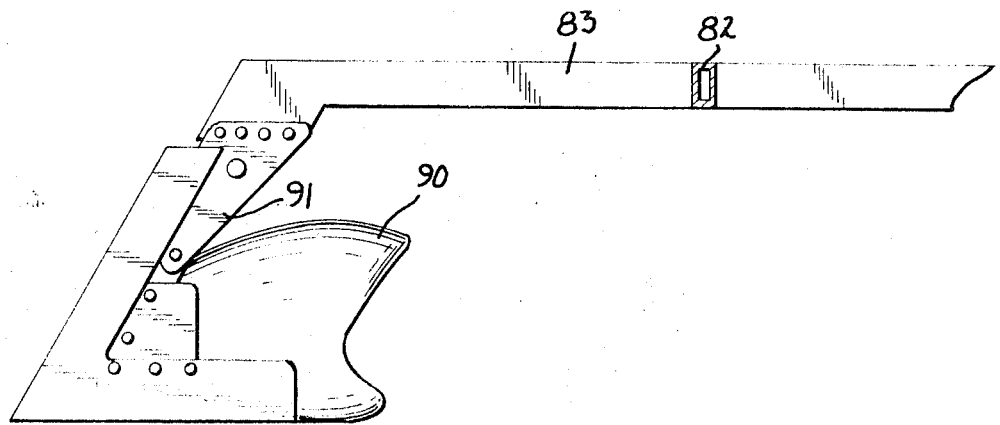
FIG. 7 is an enlarged sectional view as seen from the line 7—7 in FIG. 6.

Referring specifically to FIGS. 6 and 7 another embodiment of the present gang-plow is illustrated wherein an elongated backbone 70, formed of some convenient material such as a steel I-beam or the like, extends generally in the direction of movement of the plow. The forwardmost end of the backbone 70 has a hitch generally designated 71 affixed thereto for connecting the plow to a propelling force, such as a tractor or the like. Two spaced apart support members 75 are affixed to the backbone 70 so as to extend transversely outwardly therefrom with the outer ends thereof affixed to an elongated beam 76 extending generally parallel with the backbone 70 and spaced outwardly therefrom. The beam 76 extends rearwardly beyond the rear end of the backbone 70 a short distance and extends forwardly to approximately the mid-portion of the backbone 70. Two spaced apart support members 77 are affixed to the beam 76 in transversely outwardly extending orientation with a second beam 78 affixed to the outer ends thereof so as to be spaced from an extend parallel with the beam 76. The rear end of the beam 78 extends from approximately the same rearward position as the beam 76 forwardly a distance somewhat greater than half the distance of the beam 76. The forwardmost support members 75 and 77 are spaced rearwardly a substantial distance from the forwardmost end of the beams 76 and 78, respectively. Two support members 80 are affixed to the side of the backbone 70 opposite the support members 75 and are approximately aligned therewith. A beam 81 is affixed to the outer ends of the support members 80 approximately parallel with the backbone 70 and spaced outwardly therefrom. The rear end of the beam 81 is approximately even with the rear end of the backbone 70 and the forwardmost end thereof extends somewhat beyond the mid-point of the backbone 70. Two support members 82 are affixed to the beam 81 so as to extend transversely outwardly therefrom in a direction opposite to the support members 80 and a beam 83 is affixed to the outer ends thereof so as to extend parallel with the beam 81 and spaced outwardly therefrom. The rear end of the beam 83 is positioned somewhat forwardly to the rear end of the beam 81 and the forward end thereof is somewhat forward of the forward end of the beam 81. The forwardmost support members 80 and 82 are spaced rearwardly a substantial distance from the forward ends of the beams 81 and 83, respectively. Thus, the forward ends of the beams 76, 78, 81 and 83 are staggered in a line angularly disposed with respect to the backbone 70 and are spaced from any of the remaining parts of the gang-plow.

A single wheel 85 is affixed to the beam 78 and rearmost support member 77 so as to extend rearwardly and downwardly therefrom to support the backbone 70 and beams 76, 78, 81 and 83 in spaced relation from the surface of the ground. The distance the wheel 85 extends beneath the plow is determined by the setting of a variable linking mechanism 86, which is adjustable from the propelling force forward of the hitch 71. Because the hitch 71 cooperates with the single wheel 85 to maintain the plow in the desired orientation, the present plow is referred to as a semi-mounted plow. However, it should be understood that the plow might be constructed in the form of a completely mounted plow or a trailing plow as disclosed in the previous embodiment.

Four plow bottoms 90 are illustrated having spring-trip type standards 91 affixed thereto. Each of the standards 91 affixes one of the plow bottoms 90 to the forward end of one of the beams 76, 78, 81 or 83. The plow bottoms 90 and standards 91 are affixed to the beams 76, 78, 81 and 83 so as to extend generally downwardly and forwardly therefrom. Thus, as illustrated in FIG. 7, the plow bottom 90 is positioned with open space thereabove so that trash and the like flows easily up and around the standard 91 without catching thereon. There are no parts positioned directly above the plow bottom 90 upon which trash and the like can catch to collect and hamper the operation thereof.

Figure 8:
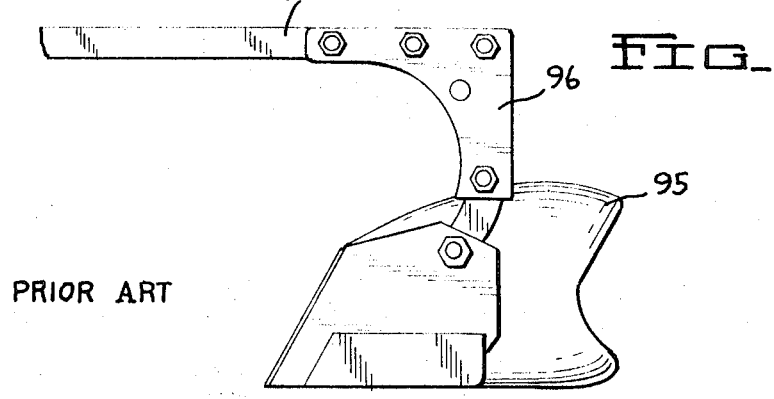
FIG. 8 is a view similar to FIG. 7 of a prior art plow.

Referring to FIG. 8 a prior art plow bottom 95, standard 96 and beam 97 are illustrated wherein the plow bottom 95 and standard 96 are affixed to the rearmost end or directly beneath the beam 97. In this prior art plow trash and the like catches on the standard 96 and works upwardly against the beam 97. If the trash is inclined to fall, it falls forwardly in front of the plow bottom 95 which simply rolls it back up against the standard 96. Thus, trash has no way of escaping and eventually builds up to a point where the operation of the plow is seriously hampered and the trash must be removed by hand.

Thus, a gang-plow is disclosed wherein the plow bottoms are mounted on downwardly and forwardly extending standards affixed adjacent the forward ends of beams so that there is no obstruction above the plow bottoms to cause trash and the like to cling thereto. Further, trash is free to flow upwardly and around the standard affixing the plow bottom to the beam and there is no tendency, as in the prior art, to roll the trash upwardly and forwardly in front of the plow bottom. Thus, the present gang-plow is greatly increased in efficiency and reduces the time and effort required in plowing.

What is claimed is:

1. A gang-plow comprising:

a. elongated frame means including an elongated bar, said frame means having a longitudinal axis extending in the direction of movement;

b. means affixed to said frame means for connecting said frame means to a propelling force and further means attached to said frame means including at least one wheel for maintaining said frame means in spaced relation above the surface of the ground;

c. backbone means including support members extending generally transverse to the longitudinal axis of said frame means;

d. a cantilevered beam affixed to each of said support members in transversely spaced relation adjacent one end so as to extend generally forwardly therefrom and located in generally parallel outwardly spaced relationship on each side of said elongated bar;

e. a standard and a plow bottom affixed to the forward end of each of said cantilevered beams so that said standard and plow bottom extend generally downwardly and forwardly from the forward end thereof; and f. means fixedly attaching said backbone means to said frame means adjacent the rear end of said frame means for defining an open space above said standards and plow bottom unencumbered by said frame means, backbone means and cantilevered beams.

2. A gang-plow comprising:

a. elongated frame means having a longitudinal axis extending in the direction of movement;

b. means affixed to said frame means for connecting said frame means to a propelling force and further means attached to said frame means including at least one wheel for maintaining said frame means in spaced relation above the surface of the ground;

c. backbone means extending generally transverse to the longitudinal axis of said frame means;

d. means fixedly attaching said backbone means to said frame means;

e. a plurality of cantilevered beams affixed to said backbone means in transversely spaced relation adjacent one end so as to extend generally forward therefrom;

f. a standard and a plow bottom; and g. means affixing said standard and plow bottom to the forward end of each of said cantilevered beams in a position so that an open space is defined above said standard and plow bottom unencumbered by said frame means, backbone means and cantilevered beams.

3. A gang-plow as set forth in claim 2 wherein the elongated frame means includes an elongated bar with the backbone means including transversely extending support members affixing the cantilevered beams in generally parallel outwardly spaced relationship on each side of said elongated bar.

4. A gang-plow comprising:

a. elongated frame means having a longitudinal axis extending in the direction of movement;

b. means affixed to said frame means for connecting said frame means to a propelling force and further means attached to said frame means including at least one wheel for maintaining said frame means in spaced relation above the surface of the ground;

c. backbone means extending generally transverse to the longitudinal axis of said frame means;

d. a plurality of cantilevered beams affixed to said backbone means in transversely spaced relation adjacent one end so as to extend generally forwardly therefrom;

e. a standard and a plow bottom affixed to the forward end of each of said cantilevered beams so that said standard and plow bottom extend generally downwardly and forwardly from the forward end thereof; and f. means fixedly attaching said backbone means to said frame means adjacent the rear end of said frame means for defining an open space above said standards and plow bottom unencumbered by said frame means, backbone means and cantilevered beams.

5. A gang-plow as set forth in claim 4 wherein the means fixedly attaching the backbone means to the frame means includes a pair of elongated members having one end affixed to each side of the frame in generally parallel, spaced apart, rearwardly extending relationship with the rearmost end of each member affixed to the backbone to position the backbone in a rearwardly spaced relationship from the frame means and define an unencumbered open space between the frame means, the backbone and the elongated members.

* * * * *